Nov. 23, 1965     A. B. TRENCH     3,219,918

CURRENT LIMITING APPARATUS

Filed May 25, 1962     3 Sheets-Sheet 1

INVENTOR.
ANTHONY B. TRENCH

BY

*Attorney*

INVENTOR.
ANTHONY B. TRENCH

United States Patent Office 3,219,918
Patented Nov. 23, 1965

3,219,918
CURRENT LIMITING APPARATUS
Anthony B. Trench, Galt, Ontario, Canada, assignor to
H & T Electrical Products, Ontario, Canada
Filed May 25, 1962, Ser. No. 197,706
7 Claims. (Cl. 323—89)

This invention relates to current limiting apparatus especially suited for use with electrical power systems. More particularly, this invention relates to current limiting apparatus for electrical power systems which is designed to limit and control overload or short circuit currents. Even more particularly, this invention relates to static current limiting apparatus, i.e. current limiting apparatus of the aforementioned type wherein there are no moving parts employed.

As is well known, in the past it has been common practice in all electrical power systems to employ circuit breakers to interrupt short circuit currents. In many instances it also has been necessary to add reactance to the electrical power systems as, for example, by installing current limiting reactors, to reduce the magnitude of short circuit currents to within the rating of the circuit breakers which are employed in the electrical power system. In such prior art electrical power systems, the short circuit currents inevitably are very large, being seldom less than 30 or 40 times the normal line current. It is not practical to attempt to reduce short circuit currents much below the aforementioned values by adding still greater amounts of reactance, because the greater the amount of reactance present in a system, the more difficult is the voltage regulation of the system. Furthermore, large amounts of reactance in an electrical power system lead to system instability and can magnify undesirable voltage surges. Consequently, it will be seen that in the past it has been necessary that the circuit breakers which are employed in electrical power systems to interrupt short circuit currents be sufficiently large and robust to interrupt a current which is 30 to 40 times normal line current. Such enormous short circuit currents have great destructive effects. They produce forces on conductors of associated equipment in the system which can be 1,000 times normal, and under such short circuit conditions temperatures may rise to many times normal in fractions of a second. Consequently, circuit breakers must interrupt the short circuit current in a power system very rapidly in order to prevent extensive damage to the electrical power system.

Despite the speed at which modern circuit breakers operate, short circuit currents in electrical power systems frequently do cause failures in large power transformers and other equipment in the system. The severe mechanical and electrical shocks to the system caused by short circuit currents of 30 to 40 times normal line current have an adverse effect on all associated equipment, including the circuit breakers themselves, and the life of such equipment can be expected to be appreciably reduced after the occurrence of each short circuit. The reduction in the life of such equipment is readily understandable when one considers that a typical normal line current of say 1,000 amperes may suddenly become a current of 40,000 amperes during the fault, as a result of which the normal forces of typically fifty pounds per foot on transformer conductors may develop into forces of the order of 50,000 pounds per foot. Under such circumstances it will be appreciated that conductors tend to and actually do move and distort unless they are strongly braced, and secondary faults subsequently tend to occur. Furthermore, during such a fault the temperatures of insulated conductors may rise to a typical value of 250° C. Temperatures of this magnitude decidedly weaken the insulation of conductors and shorten the effective life of the insulation, the ultimate result of which may eventually be a major breakdown. During such faults destructive electrical surges may also occur.

Accordingly, it is one object of my invention to provide apparatus designed to limit and control overload or short circuit currents in electrical power systems by virtue of which overload or short circuit currents can be limited to a value not greatly in excess of the normal line current, say to two or three times normal line current.

It is another object of my invention to provide current limiting apparatus which renders the use of circuit breakers unnecessary.

A further object of my invention is to provide current limiting apparatus which limits overload or short circuit currents of electrical power systems to a value not greatly in excess of normal line current and which subsequently causes the overload or short circuit current to decrease to substantially zero.

Yet an additional object of my invention is to provide current limiting apparatus of the aforementioned type which is static, i.e. which employs no moving parts.

Another object of my invention is to provide current limiting apparatus which does not substantially affect the voltage regulation of an electrical power system at or below normal line current.

As is well known, once a circuit breaker has tripped in order to interrupt an overload or short circuit current, it is necessary to reset the circuit breaker when the fault has been detected and cured.

Accordingly, it is yet another object of my invention to provide current limiting apparatus which is reversible without requiring manual resetting, i.e. which, upon the removal of the short circuit or overload in the system and the closure of the line disconnect switch, which previously will have been opened to permit the fault to be rectified, will permit normal conditions automatically to be resumed in the electrical power system.

The particular merit of this invention is in the function of my apparatus in limiting overload or short circuit currents to a relatively low magnitude of only two to three times normal line current where little or no damaging effects are experienced by equipment in the electrical power system. Furthermore, even this low peak short circuit or overload current is only transitory in nature and the short circuit or overload current passes rapidly to substantially zero magnitude during the fault. However, it should be noted that it is not absolutely necessary that apparatus embodying my invention be designed to limit overload or short circuit currents to two to three times normal load current. Much greater peak overload or short circuit currents may be tolerated and still be a vast improvement on the protection of present electrical power systems.

In brief, in accordance with my invention I provide, in combination with an electrical load current limiting means. The current limiting means comprise saturable reactor means including A.C. winding means, D.C. winding means, and at least two core means. The A.C. winding means are connected in series with the load, and means are provided for supplying alternating line current to the load through the A.C. winding means. Rectifying means are connected in parallel with the load and supply direct current proportional to the voltage across the load to the D.C. winding means.

My invention will become more apparent from the following detailed description taken in conjunction with the drawings in which.

Figure 1:
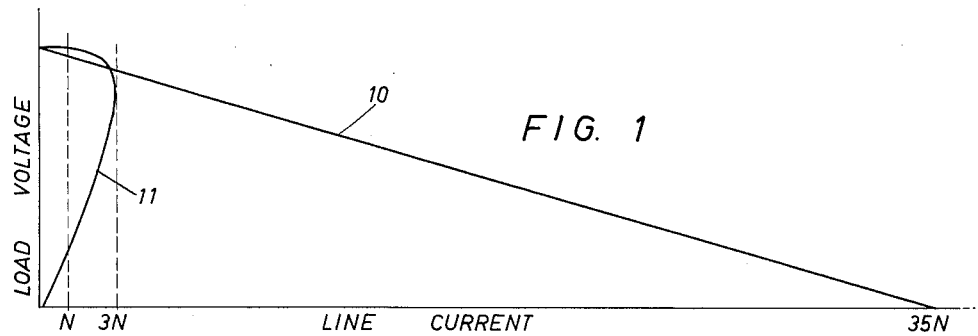
FIGURE 1 is a graph showing load voltage plotted against line current and illustrating a curve which is characteristic of a present prior art type electrical system and a curve which is characteristic of an electrical power system employing current limiting apparatus embodying my invention.

Turning first to FIGURE 1, curve 10 is the characteristic load vs. line current curve of a typical prior art electrical power system employing reactance and circuit breakers. It will be seen that upon a short circuit occurring in such an electrical power system across the load thereof, the line current rises to a typical value of thirty-five times normal line current, normal line current being designated by the numeral N on the abscissa of the graph shown in FIGURE 1. Curve 11, on the other hand, is the characteristic load voltage vs. line current curve of an electrical power system employing current limiting apparatus embodying my invention. It will be seen that with apparatus embodying my invention the load voltage begins to fall rapidly as the line current increases above normal to a typical peak value of three times normal line current. A short circuit across the load ultimately will cause the line current to fall to near zero from its peak value of three times normal line current, as is shown in FIGURE 1.

Figure 2:
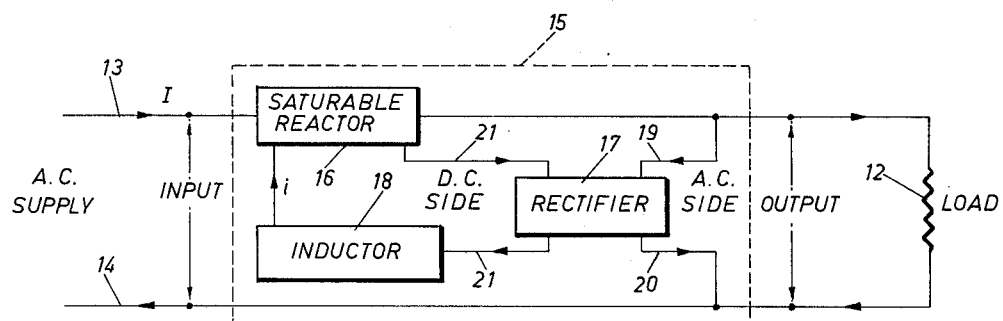
FIGURE 2 is a schematic representation of an electrical power system employing apparatus embodying my invention.

Referring now to FIGURE 2 wherein I have shown a single phase electrical power system employing apparatus embodying my invention, there is provided a load 12 supplied by conductors 13 and 14 which are connected to any suitable source of alternating current. Current limiting apparatus embodying my invention is shown at 15 and includes a saturable reactor 16, a rectifier 17 and preferably an inductor 18. It will be noted that rectifier 17 is connected in parallel with load 12 by conductors 19 and 20. Rectifier 17 supplies direct current to saturable reactor 16 through inductor 18 and conductor 21.

Figure 3:
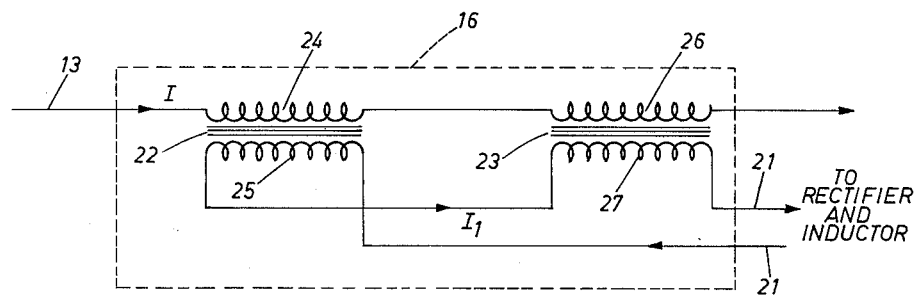
FIGURE 3 depicts in greater detail a saturable reactor for use with current limiting apparatus embodying my invention.

One suitable type of saturable reactor 16 is shown in FIGURE 3 and includes two iron cores 22 and 23. An A.C. winding 24 and a D.C. winding 25 are wound around core 22. An A.C. winding 26 and a D.C. winding 27 are wound around core 23. It is very important to note that A.C. winding 24 and D.C. winding 25 are wound with respect to core 22 and so connected that a D.C. flux is produced in core 22 which is opposite to the A.C. flux which is produced in core 22 during positive half cycles of the alternating line current I. Similarly, A.C. winding 26 and D.C. winding 27 are wound with respect to core 23 and so connected to produce a D.C. flux in core 23 which is opposite to the A.C. flux in core 23 during negative half cycles of the alternating line current I.

Figure 6:
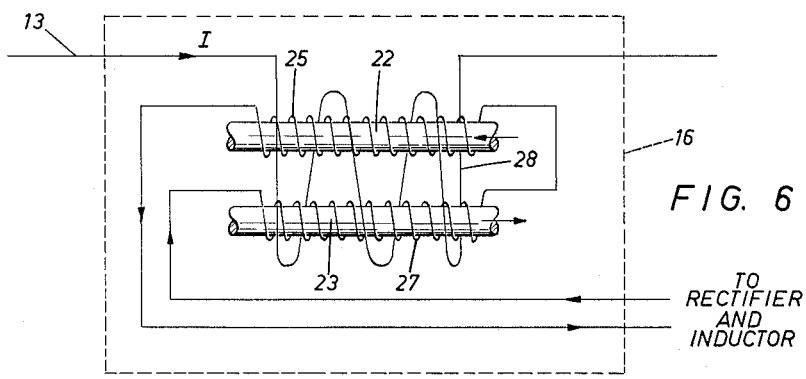
FIGURE 6 shows an alternative type of saturable reactor.

An alternative saturable reactor 16 which may be used in practising my invention is shown in FIGURE 6. In this case there are provided cores 22 and 23, D.C. windings 25 and 27 and a single A.C. winding 28. Again it will be noted that A.C. winding 28 and D.C. winding 25 are wound on core 22 and so connected as to produce a D.C. flux in core 22 which is opposite to the A.C. flux produced in this core during positive half cycles of the alternating line current I. Similarly, A.C. winding 28 and D.C. winding 27 are wound on core 23 and so connected as to produce a D.C. flux in core 23 which is opposite to the A.C. flux produced in this core during negative half cycles of the alternating line current I. It will be noted that A.C. winding 28 (FIG. 6) and A.C. windings 24 and 26 (FIG. 3) are connected in series with load 12.

Figure 8:
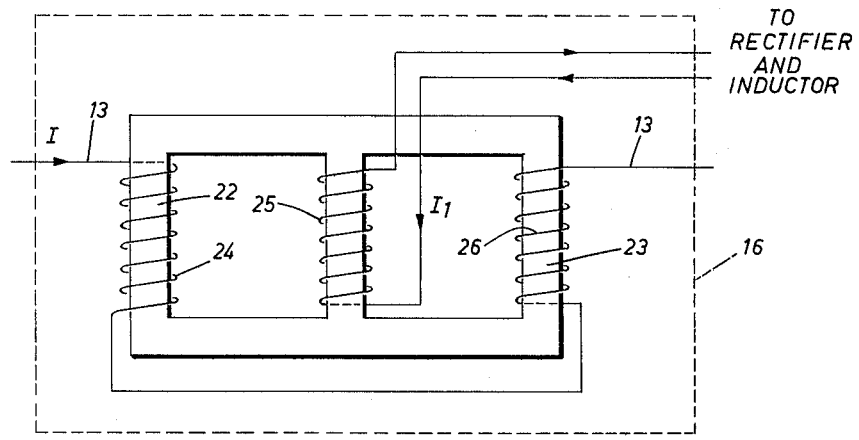
FIGURE 8 shows an alternative saturable reactor for use with current limiting apparatus embodying my invention.

An alternative but decidedly less preferable saturable reactor 16 which may be used in practising my invention is shown in FIGURE 8. In this case there are provided cores 22 and 23, a D.C. winding 25 and A.C. windings 24 and 26. As beforehand, it will be noted that A.C. winding 24 and D.C. winding 25 are so wound and connected as to produce a D.C. flux in core 22 which is opposite to the A.C. flux produced in this core during positive half cycles of the alternating line current I. Similarly, A.C. winding 26 and D.C. winding 25 are so wound and connected as to produce a D.C. flux in core 23 which is opposite to the A.C. flux produced in this core during negative half cycles of the alternating line current I. It will be seen that A.C. windings 24 and 26 in FIGURE 8 are connected in series with load 12.

Figures 4, 5:
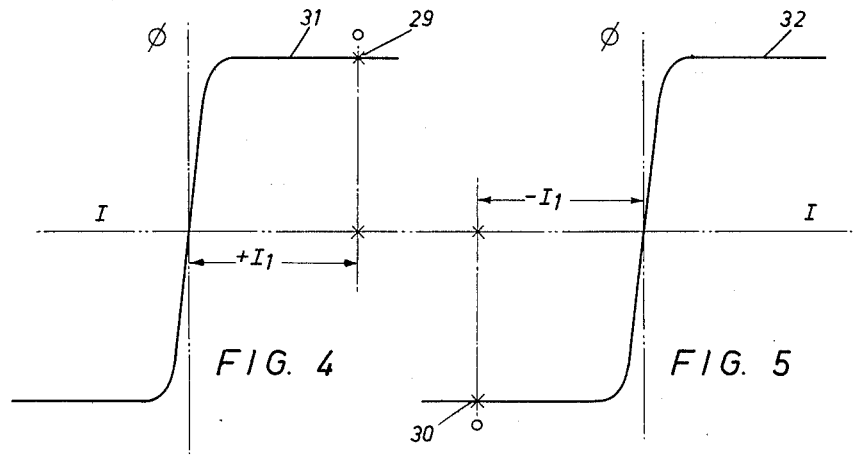
FIGURES 4 and 5 illustrate the reactor characteristics of the two cores shown in FIGURE 3.

Rectifier 17, being connected in parallel with load 12, supplies a direct current $I_1$ to D.C. windings 25 and 27, which are connected in series, which is proportional to the voltage across load 12. The circuit components are so selected that the direct current $I_1$ passing through D.C. windings 25 and 27 under normal load conditions, i.e. when the alternating line current I is equal to rated current, is sufficiently large to saturate cores 22 and 23. This is best seen in FIGURES 4 and 5 which depict the reactor characteristics for cores 22 and 23 respectively, from which it will be seen that core 22 is saturated in a positive direction by the direct current $I_1$, whereas core 23 is saturated in a negative direction by the direct current $I_1$, the cores 22 and 23 being operated under conditions which correspond to points 29 and 30 respectively on reactor characteristic curves 31 and 32 respectively. Under such circumstances, i.e. when normal alternating line current I is passing through load 12, the alternating line current I is offered very little impedance by A.C. windings 24 and 26 in FIGURES 3 and 8 and by A.C. winding 28 in FIGURE 6, because the iron of cores 22 and 23 is completely saturated and cannot produce a substantial inductive effect. Hence, up to normal load conditions there is very little voltage drop across A.C. windings 24 and 26 in FIGURES 3 and 8 and A.C. winding 28 in FIGURE 6. Thus, up to normal load conditions the alternating line current I is not substantially affected by the presence of current limiting apparatus 16, and the voltage drop across A.C. windings 24 and 26 or across A.C. winding 28 is slight.

Overload or short circuit conditions where there is an increase in line current I above normal now will be discussed. Referring to FIGURE 3, the circuit components are selected in such a manner that the positive A.C. flux produced in core 23 by the positive half cycles of alternating line current I in A.C. winding 26 desaturates core 23 when the instantaneous magnitude of this positive A.C. flux is at least substantially equal to the magnitude of negative D.C. flux produced in core 23 by the direct current $I_1$ passing through D.C. winding 27. Similarly, the negative A.C. flux produced in core 22 during the negative half cycles of alternating line current I by the flow of alternating line current through A.C. winding 24 desaturates the core 22 when the instantaneous magnitude of this negative A.C. flux is at least substantially equal to the magnitude of the positive D.C. flux produced in core 22 by the direct current $I_1$ flowing through direct current winding 25. Thus, when the alternating line current I attempts to rise above normal, cores 22 and 23 are desaturated during both the positive and negative half cycles of alternating line current I and, as a result, an effective inductance appears in series with load 12 which tends to limit the peak values on both the negative and positive sides of the alternating line current wave. This effective inductance which is due to the desaturation of cores 22 and 23 and the consequent increase in the inductive effect of A.C. windings 24 and 26 in turn results in a voltage drop across A.C. windings 24 and 26 which results in a reduced voltage being applied across load 12 and hence across rectifier 17. Since the voltage across rectifier 17 is diminished as aforementioned, the direct current $I_1$ flowing through D.C. windings 25 and 27 will diminish, thereby effecting a greater desaturation of cores 22 and 23 and creating a greater inductive effect, i.e. a higher inductive impedance in series with load 12. The complete sequence of events aforementioned therefore is repeated with a further reduction in load voltage, a further reduction in direct current $I_1$, etc. Hence the tendency is for the voltage across load 12 to drop off sharply as the alternating line current I attempts to increase beyond normal value. A limit is reached which the alternating line current I cannot exceed, and any further reduction in the impedance of load 12 produces an unstable state which results in the alternating current I progressively diminishing to near zero as shown in FIGURE 1. It should be readily apparent from the foregoing that a complete short circuit across load 12 will result in the sequence of events outlined above, by virtue of which the alternating line current I will ultimately diminish to near zero as shown in FIGURE 1.

It should be readily apparent also that the same sequence of events as outlined above will take place in the event that a saturable reactor 16 of the type shown in FIGURES 6 or 8 is employed in place of the saturable reactor 16 shown in FIGURE 3.

In this connection it will be noted in the case of saturable reactor 16 shown in FIGURE 6 that the A.C. flux produced in core 23 during the positive half cycles of alternating line current I in A.C. winding 28 desaturates core 23 when the instantaneous magnitude of this A.C. flux is at least substantially equal to the magnitude of the D.C. flux produced in core 23 by the direct current $I_1$ passing through D.C. winding 27. Similarly, the A.C. flux produced in core 22 during negative half cycles of alternating line current I by the flow of alternating line current through A.C. winding 28 desaturates core 22 when the instantaneous magnitude of this A.C. flux is at least substantially equal to the magnitude of the D.C. flux produced in core 22 by the direct current $I_1$ flowing through direct current winding 25. In the case of saturable reactor 16 shown in FIGURE 8, A.C. winding 24 and D.C. winding 25 again are so wound and connected that the A.C. flux produced in core 22 during negative half cycles of alternating line current I in A.C. winding 24 desaturates core 22 when the instantaneous magnitude of this A.C. flux is at least substantially equal to the magnitude of the D.C. flux produced in core 22 in the opposite direction by the direct current $I_1$ passing through D.C. winding 25. Similarly D.C. winding 25 and A.C. winding 26 are so wound and connected that the A.C. flux produced in core 23 during positive half cycles of alternating line current I in A.C. winding 26 desaturates core 23 when the instantaneous magnitude of this A.C. flux is at least substantially equal to the magnitude of the D.C. flux produced in core 23 in the opposite direction by the direct current $I_1$ passing through D.C. winding 25.

Inductor 18 shown in FIGURE 2 is preferably employed in order to stabilize the direct current $I_1$ flowing through D.C. windings 25 and 27. The absence of this inductor would result in a D.C. current from rectifier 17 which would tend to fluctuate in sympathy with the positive and negative crests of the alternating line current wave I whenever this line current exceeded normal value. Such a response of the direct current $I_1$ would tend to nullify the required inductive effect which is sought to be achieved in series with load 12, and hence the use of inductor 18 is decidedly preferred. In other words, the purpose of inductor 18 is to resist changes in the direct current $I_1$ flowing through windings 25 and 27, in order that the alternating line current I may encounter a substantial inductive effect in A.C. windings 24 and 26, or in A.C. standing 28, whenever this current exceeds normal magnitude. The size of inductor 18 determines the limit of magnitude which may be attained by the alternating line current I; the larger the inductor, the smaller the peak short circuit or overload current shown in FIGURE 1.

Rectifier 17 may be of any conventional type and would generally comprise a step-down transformer connected across load 12, silicon rectifier cells, a capacitor across the D.C. output side and a suitable surge protective device for the cells.

The step-down transformer is generally required for the rectifier cells which would be operating normally at a low voltage. The high voltage side of this transformer would be connected across load 12 and would draw a small alternating current. The low voltage side would deliver a relatively large alternating current for rectification to direct current by the silicon rectifier cells.

Inductor 18 may be a coil of large inductance with low resistance. If an iron core is used with this inductor care must be taken in designing proper air gaps to ensure that the iron does not saturate from the direct current $I_1$. It may be expedient in some instances to connect a capacitor across inductor 18 in order to increase the effective impedance thereof.

Figure 7:
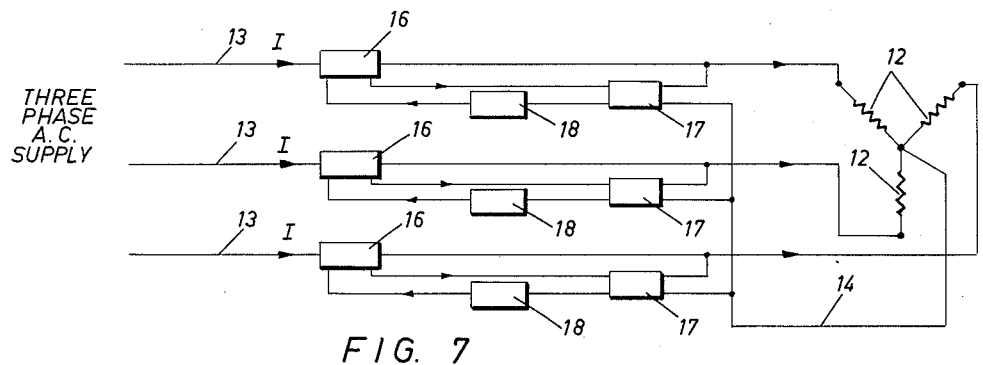
FIGURE 7 is a schematic representation of a three-phase electrical power system employing current limiting apparatus embodying my invention.

In FIGURE 7 I have shown a three-phase electrical power system employing current limiting apparatus embodying my invention. Similar components to those already noted are similarly numbered in FIGURE 7. In the case of the apparatus shown in FIGURE 7 it will be noted that rectifiers 17 all have one side thereof connected to a neutral conductor, and thus each rectifier 17 is effectively connected in parallel with the portion of the load supplied by the particular phase in question.

It should be noted that while I have indicated herein that rectifier 17 is connected in parallel with load 12, it will be appreciated that the same effect may be achieved by connecting rectifier 17 in parallel with only a portion of load 12. Thus, where herein I specify rectifying means connected in parallel with a load, this is intended to cover the case where the rectifying means is connected in parallel with only a part of the load.

While I have described certain preferred embodiments of my invention other forms and embodiments of my invention are possible and those skilled in the art will appreciate that changes and modifications may be made therein without departing from the spirit and scope of my invention as set out in the appended claims.

What I claim as my invention is:

1. In combination with an electrical load, current limiting means, said current limiting means comprising saturable reactor means including A.C. winding means, D.C. winding means, and at least two saturable core means, said A.C. winding means being connected in series with said load, means for supplying alternating line current to said load through said A.C. winding means, rectifying means connected in parallel with said load and supplying direct current proportional to the voltage across said load to said D.C. winding means, during passage of said direct current through said D.C. winding means at least a portion of said D.C. winding means producing a first D.C. flux in one of said core means and at least a portion of said D.C. winding means producing a second D.C. flux in another of said core means, during positive half cycles of said alternating line current at least a portion of said A.C. winding means producing a first A.C. flux in said one core means in opposition to said first D.C. flux, during negative half cycles of said alternating line current at least a portion of said A.C. winding means producing a second A.C. flux in said other core means in opposition to said second D.C. flux, said first and second D.C. fluxes under normal load conditions saturating said core means, said A.C. winding means thereby having a low A.C. impedance under normal load conditions, said first A.C. flux desaturating said one core means when the instantaneous magnitude of said first A.C. flux is at least substantially equal to the magnitude of said first D.C. flux, said second A.C. flux desaturating said other core means when the instantaneous magnitude of said second A.C. flux is at least substantially equal to the magnitude of said second D.C. flux, whereby said A.C. winding means have a high A.C. impedance in series with said load for alternating line currents in excess of a predetermined magnitude, and inductive means connected in series with said D.C. winding means for resisting changes in said direct current.

2. In combination with an electrical load, current limiting means, said current limiting means comprising saturable reactor means including first and second A.C. windings, first and second D.C. windings and first and second saturable cores, said A.C. windings being connected in series with said load and in series with each other, means for supplying alternating line current to said load through said A.C. windings, rectifying means connected in parallel with said load and supplying direct current proportional to the voltage across said load to said D.C. windings, during passage of said direct current through said D.C. windings said first D.C. winding producing a first D.C. flux in said first core and said second D.C. winding producing a second D.C. flux in said second core, during positive half cycles of said alternating line current said first A.C. winding producing a first A.C. flux in said first core in opposition to said first D.C. flux, during negative half cycles of said alternating line current said second A.C. winding producing a second A.C. flux in said second core in opposition to said second D.C. flux, said first and second D.C. fluxes under normal load conditions saturating said first and second cores, said A.C. windings thereby having a low A.C. impedance under normal load conditions, said first A.C. flux desaturating said first core when the instantaneous magnitude of said first A.C. flux is at least substantially equal to the magnitude of said first D.C. flux, said second A.C. flux desaturating said second core when the instantaneous magnitude of said second A.C. flux is at least substantially equal to the magnitude of said second D.C. flux, whereby said A.C. windings have a high A.C. impedance in series with said load for alternating line currents in excess of a predetermined magnitude, and inductive means connected in series with said D.C. windings for resisting changes in said direct current.

3. The invention according to claim 2 wherein said first and second D.C. windings are connected in series.

4. The invention according to claim 3 wherein said first A.C. winding and said first D.C. winding are wound over said first core and said second A.C. winding and said second D.C. winding are wound over said second core.

5. In combination with an electrical load, current limiting means, said current limiting means comprising said saturable means including an A.C. winding, first and second D.C. windings and first and second saturable cores, said A.C. winding being connected in series with said load, means for supplying alternating line current to said load through said A.C. winding, rectifying means connected in parallel with said load and supplying direct current proportional to the voltage across said load to said D.C. windings, during passage of said direct current through said D.C. windings said first D.C. winding producing a first D.C. flux in said first core and said second D.C. winding producing a second D.C. flux in said second core, during positive half cycles of said alternating line current said A.C. winding producing a first A.C. flux in said first core in opposition to said first D.C. flux, during negative half cycles of said alternating line current said A.C. winding producing a second A.C. flux in said second core in opposition to said second D.C. flux, said first and second D.C. fluxes under normal load conditions saturating said first and second cores, said A.C. winding thereby having a low A.C. impedance under normal load conditions, said first A.C. flux desaturating said first core when the instantaneous magnitude of said first A.C. flux is at least substantially equal to the magnitude of said first D.C. flux, said second A.C. flux desaturating said second core when the instantaneous magnitude of said second A.C. flux is at least substantially equal to the magnitude of said second D.C. flux, whereby said A.C. winding has a high A.C. impedance in series with said load for alternating line currents in excess of a predetermined magnitude, and inductive means connected in series with said D.C. windings for resisting changes in said direct current.

6. The invention according to claim 5 wherein said first D.C. winding is wound over said first core, said second D.C. winding is wound over said second core and said A.C. winding is wound over said first and said second cores.

7. In combination with an electrical load, current limiting means, said current limiting means comprising saturable reactor means including first and second A.C. windings, a D.C. winding, and first and second saturable cores, said first and second A.C. windings being connected in series with said load and in series with each other, means for supplying alternating line current to said load through said first and second A.C. windings, rectifying means connected in parallel with said load and supplying direct current proportional to the voltage across said load to said D.C. winding, during passage of said direct current through said D.C. winding said D.C. winding producing a first D.C. flux in said first core and producing a second D.C. flux in said second core, during positive half cycles of said alternating line current said first A.C. winding producing a first A.C. flux in said first core in opposition to said first D.C. flux, during negative half cycles of said alternating line current said second A.C. winding producing a second A.C. flux in said second core in opposition to said second D.C. flux, said first and second D.C. fluxes under normal load conditions saturating said first and second cores, said first and second A.C. windings thereby having a low A.C. impedance under normal load conditions, said first A.C. flux desaturating said first core when the instantaneous magnitude of said first A.C. flux is at least substantially equal to the magnitude of said first D.C. flux, said second A.C. flux desaturating said second core when the instantaneous magnitude of said second A.C. flux is at least substantially equal to the magnitude of said second D.C. flux, whereby said A.C. windings have a high A.C. impedance in series with said load for alternating line currents in excess of a predetermined magnitude, and inductive means connected in series with said D.C. winding for resisting changes in said direct current.

References Cited by the Examiner
UNITED STATES PATENTS

| | | | |
|---|---|---|---|
| 1,449,878 | 3/1923 | Austin | 323—89 |
| 2,435,572 | 2/1948 | Bixby | 323—89 |
| 2,743,152 | 4/1956 | Carleton | 323—89 |
| 3,045,170 | 7/1962 | Howald | 321—14 |

MILTON O. HIRSHFIELD, *Primary Examiner.*

LLOYD MCCOLLUM, *Examiner.*